Jan. 31, 1967     V. FRESOLONE, JR     3,301,282
BLEEDING TOOL AND APPARATUS FOR HYDRAULIC SYSTEMS
Filed June 5, 1964
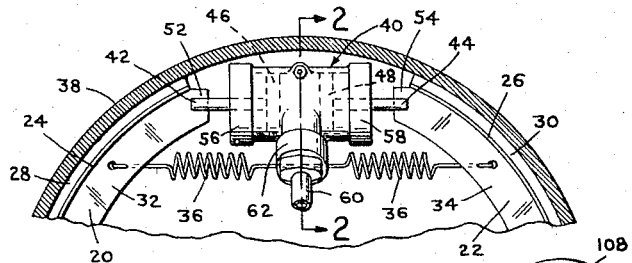
FIG. 1
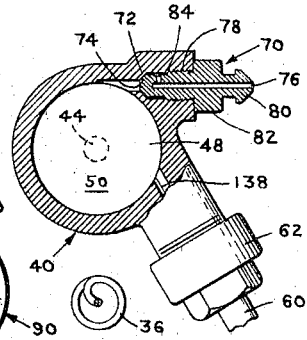
FIG. 2
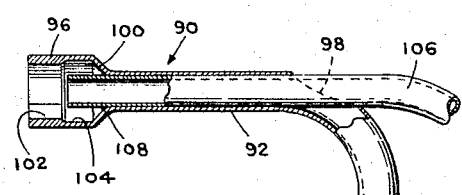
FIG. 4
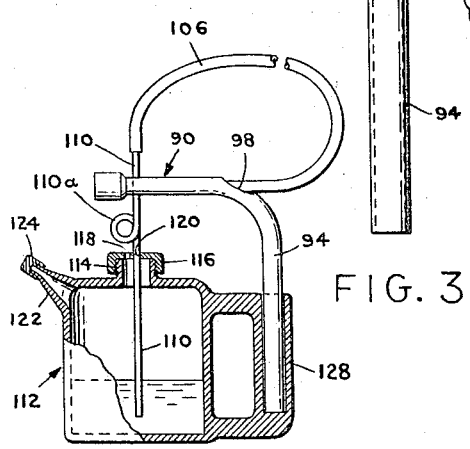
FIG. 3
FIG. 7
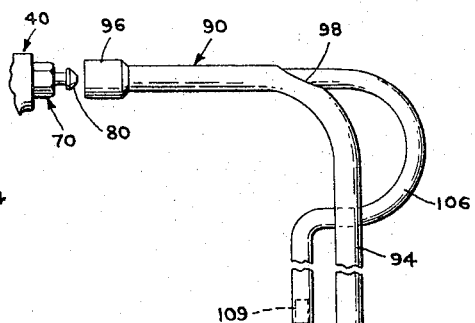
FIG. 5
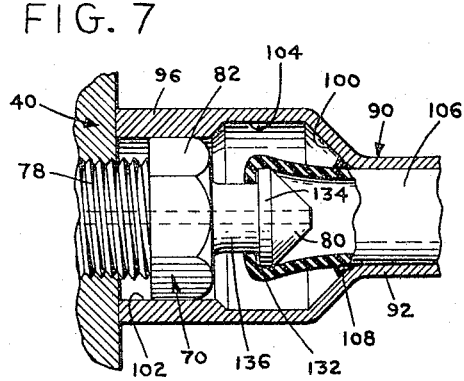
FIG. 6
VITO FRESOLONE JR.
INVENTOR.
BY Daniel H. Bobis
ATTY United States Patent Office 3,301,282
Patented Jan. 31, 1967

3,301,282
BLEEDING TOOL AND APPARATUS FOR
HYDRAULIC SYSTEMS
Vito Fresolone, Jr., 906 Lorraine Ave.,
Union, N.J. 07083
Filed June 5, 1964, Ser. No. 372,977
8 Claims. (Cl. 141—98)

This invention relates generally to a tube holder tool. More particularly, the invention relates to a tube holder tool system for bleeding the hydraulic brake system of a vehicle, such as a car or truck.

Heretofore, the bleeding of the vehicle hydraulic brake system was accomplished in the prior art by a two step operation of first loosening the bleed screw nut with a wrench and then attaching an independent bleed tube thereto. Various types of tools attempted to combine the two operations, unsuccessfully, as they resulted in air leakage into the wheel cylinder, caused from loose fittings or faulty spring loaded members.

An object of the present invention is to provide an improved tube holder tool and system for the same which overcomes the prior art difficulties; which provides for a positive sealed relationship between the wheel cylinder and the system; which is sized to facilitate easy access to the wheel cylinder; which collects discharged fluid and allows air to automatically pass from the collected fluid; which is reliable, economical and easy to operate or store.

Other objects and advantages will be obtained from the following description of one embodiment of the invention and the novel features will be particularly pointed out hereinafter in the claim.

In the drawing:

FIGURE 1 is a partial sectional elevation of a vehicular brake mechanism.

FIGURE 2 is a view, partly in section, taken along line 2—2 of FIGURE 1.

FIGURE 3 is a side view, partly in section, of the improved tube holder tool.

FIGURE 4 is a partial front view of the improved tube holder tool looking into the bleed screw engaging end thereof.

FIGURE 5 is a side elevation of the improved tube holder tool system, immediately before its engagement with the bleed screw of the wheel cylinder.

FIGURE 6 is a partial sectional view showing the operative position of the bleed screw engaging means of the tube holder tool, including the tubing sealingly engaging the tapered tip of the bleed screw.

FIGURE 7 is a side view partly in section of the improved tube holder tool system during non service.

In the illustrated embodiment of the invention, the improved tube holder tool system may be used in association with any conventional type vehicular hydraulic brake system, as for example that shown in FIGURE 1, which includes the usual components of a pair of brake shoes 20 and 22 in the form of arcuate segments, said brake shoes being provided with arcuate rim portions 24 and 26 supporting lining elements 28 and 30, respectively. The rim portions 24 and 26 are reinforced against flexure by web portions 32 and 34 extending perpendicularly from the rim portions 24 and 26.

Brake shoes 20 and 22 are fixed in position (not shown) in the usual manner well known in the art. Spring 36 is connected between webs 32 and 34 to urge brake shoes 20 and 22 towards each other away from brake drum 38, which drum is mounted on the wheel hub (not shown) of the vehicle for rotation therewith.

A hydraulic wheel cylinder 40 having plunger members 42 and 44 extending from opposite ends thereof into engagement with the webs 32 and 34 provides the actuating device for moving the brake shoes 20 and 22 into engagement with the brake drum 38. The plunger members 42 and 44 extend from piston members 46 and 48 disposed within the wheel cylinder 40, hydraulic fluid being delivered into wheel cylinder 40 to chamber 50 formed between piston members 46 and 48 from a conventional pedal operated master cylinder (not shown). Spring 36 normally retains the slotted ends of the plungers 42 and 44 in engagement with the ends 52 and 54 of the brake shoes 20 and 22 when there is no hydraulic pressure expended from wheel cylinder 40. To prevent dirt and fine matter from entering wheel cylinder 40, the usual end caps 56 and 58 are provided to close the ends of wheel cylinder 40 while permitting the slideable actual movement of plungers 42 and 44. Brake fluid is delivered to wheel cylinder 40 through line 60 connected thereto by connector member 62.

Wheel cylinder 40 has a typical bleed screw 70 threadedly connected thereto in a normally closed position by the action of corresponding tapered seats 72 and 74. The bleed screw 70 is provided with the usual bleed passage 76 which extends inwardly along its axis and prior to reaching the tapered seats 74 thereof, passes radically to the periphery thereof between tapered seat 74 and threaded section 78. A tapered tip 80 is formed at the end remote from seat 74. A nut section 82 is formed between threaded section 78 and the tapered tip 80. When seat 74 engages the corresponding seat 72 of wheel cylinder 40, there can be no passage of fluid from chamber 50 to bleed passage 76 and this is usually the case. However, periodically, for repairs or other reasons, wheel cylinder 40 must be bled at which time bleed screw 70 will be turned by means engaging its nut section 82 so as to unseat tapered section 74 which allows chamber 50 to communicate with recess 84 and bleed passage 76. This is so because recess 84 of wheel cylinder 40 is in superposition to the radial opening of bleed passage 76 so that on bleed screw 70 being unseated from tapered seat 72 fluid in chamber 50 will pass to recess 84 and then be discharged from wheel cylinder 40 through bleed passage 76.

The improved tube holder tool 90 is illustrated in FIGURE 3 and has a hollow body portion 92 disposed between end portion 96 and handle portion 94, with the latter in substantial perpendicular relation thereto. Body portion 92 has a tube opening 98 formed on the end thereof adjacent the handle portion 94. At the other end of body portion 92 a flared section 100 draws the body portion 92 to end portion 96. Accordingly, the end portion 96 is of larger diameter than the body portion 92 and has a socket 102 formed at its outermost end, a recess 104 formed inwardly of socket 102 and flared section 100 connecting end portion 96 to body portion 92. Tubing 106 extends into tube opening 98 and through to body portion 92 into the end portion 96 of the improved tube holder tool 90. The distance tubing 106 extends into end portion 96 may be predetermined by the size and shape of the bleed screw 70 and its tapered tip 80, with the minimum length of extension of tubing 106 being set so as to enable tubing 106 to sealingly engage tapered tip 80, as more fully described hereinafter. Once the distance is determined tubing 106 may be cemented in place within the improved tube holder tool 90 as at 108 or may even be held in place by the frictional engagement of the tubing 106 and the body portion 92.

FIGURE 4 shows the front view of the improved tube holder tool 90, particularly end portion 96 having socket 102 formed in the conventional hexagonal shape corresponding to the hexagonal nut section 82. Tubing 106 may be circular and fixedly connected to the improved tube holder 90 as at 108.

The improved tube holder tool system, as illustrated in FIGURE 5, is shown in proximity to bleed screw 70.

The bleed screw 70 is seated within wheel cylinder 40 ready for engagement by the improved tool holder 90. The tubing 106 extends through the tube opening 98 of the improved tube holder tool 90 to sealingly connect as at 109 to line 110, which line is disposed in a suitable container 112.

Line 110 may be made of transparent material and has a sight loop 110a formed therein for purposes more fully described hereinafter.

Container 112 is shown in FIGURES 5 and 7 and has a threaded neck portion 114 to which a cap 116 is threadedly connected. Cap 116 has a vent 118 therein to prevent the buildup of pressure in container 112 and to allow the passage of air therefrom. Also, line 110 is suitably held in position with opening 120 of cap 116. Container 112 has a spout 122 which is provided with a spout cap 124 that normally prevents discharge of fluid from container 112 but on its removal, fluid in container 112 may be discharged from spout 122. On the opposite side of spout 122 is a handle 126 the vertical section 128 of which has a hole 130 which extends the greater length thereof. The purpose for hole 130 is to provide a ready point of retention for handle portion 94 of improved tube holder tool 90 so that during periods of non-use the system may be conveniently stored at one location.

In order to bleed the wheel cylinder 40, socket 102, end portion 96 engages nut section 82 of bleed screw 70 and on suitable counter clockwise rotation of the improved tool holder 90 caused by the movement of handle 94 the tapered set 74 of bleed screw 70 will be unseated from tapered seat 72 of the wheel cylinder 40 so that chamber 50 will be in communication with bleed passage 76.

Simultaneously with the loosening of bleed screw 70 the end 132 of tubing 106 will engage tapered tip 80 and the outer rim 134 thereof to sealingly connect the tubing 106 to the bleed screw 70 thus preventing any leakage of air into wheel cylinder 40. In fact the loosening of the bleed screw 70 will act to urge the tip 80 into further engagement with tubing 106 inwardly of end 132 thereof. FIGURE 6 illustrates the fact that tubing 106 is of smaller diameter than the diameter of rim 134 of tip 80 so that the resilient tubing 106 must expand to pass over the rim 134 and thereafter will contract and engage collar 136 located between tip 80 and nut selection 82 of the bleed screw 70. Recess 104 of end portion 96 provides sufficient room to allow for the expansion of tubing 106 over rim 134 and prevents any problem of binding of tubing 106 or malfunction of the sealing engagement between tubing 106 and tip 80. Thus during the bleeding operation when the foot pedal (not shown) urges the brake fluid from the master cylinder (not shown) through line 60, into passage 138 leading to chamber 50, the wheel cylinder 40 can be bled of any entrapped air therein by having the fluid and entrapped air pass through the now unseated seat 74 to communicate with bleed passage 78 and pass into tubing 106 to line 110 from which it is discharged into container 112. On the fluid line 110 passing through sight loop 110a the operator will be able to visually determine whether or not said fluid has any remaining entrapped air therein. Accordingly the operator may continue the bleeding operation until the fluid passing the sight loop 110a is free of any air bubbles.

After all the entrapped air has been removed from chamber 50 of wheel cylinder 40, handle portion 94 of the improved tube holder tool 90 will be suitably rotated clockwise so that the engaged socket 102 will cause the nut section 82 and bleed screws 70 to turn correspondingly and urge the bleed screw 70 in an inwardly direction so that tapered seat 74 will once again seat upon the corresponding tapered seat 72 of wheel cylinder 40 to prevent the passage of fluid from chamber 50 to either recess 84 or bleed passage 76. Thereafter the improved tube holder tool 90 will be removed from engagement with bleed screw 70 thus causing a likewise disengagement between tubing 106 and tip 80.

From the foregoing, it is apparent that the improved tube holder tool system enables the tubing 106 to maintain a sealed relationship with the tip 80 of bleed screw 70 at all times during the bleeding operation and the sealed relationship is not broken until after the bleed screw 70 has been returned to its closed position.

It will be understood that various changes in the details, materials, arrangements of parts and operating conditions which have been herein described and illustrated in order to explain the nature of the invention may be made by those skilled in the art within the principles and scope of the invention as expressed in the claims.

What is claimed is:

1. A bleeding device for a hydraulic braking system having at least one externally disposed bleeding screw comprising,
    (a) a tube holder tool having a hollow body portion with a tube receiving opening at one end and a handle portion connected to the hollow body portion,
    (b) said body portion of the tube holder tool having a bleed screw engaging means spaced from the tube receiving opening,
    (c) a tube,
    (d) said tube mounted in the hollow body portion concentric to the bleed screw engaging means and having one end terminating in a plane adjacent the bleed screw engaging means to coact with and seal the end of said bleed screw during operation of the tube holder tool,
    (e) said tube disposed to extend out of the hollow body portion through said tube receiving opening,
    (f) a vented container,
    (g) a means connecting the end of the tube remote from the bleed screw engaging end to said container whereby on operation of the tube holder tool brake fluid from said hydraulic system will flow from the bleed screw through said tube to the container.

2. In a bleeding device for a hydraulic braking system as claimed in claim 1 wherein,
    (a) a recess is formed in the hollow body portion of the tube holder tool substantially in the same plane as the end of the tube adjacent the bleed screw engaging means.

3. In a bleeding device for a hydraulic braking system as claimed in claim 2 wherein,
    (a) said tubing has a smaller diameter than the diameter of the end of the bleed screw,
    (b) said recess having a diameter greater than the bleed screw engaging means to permit the tubing to expand and sealingly engage the end of the bleed screw and to rotate therewith when the bleed screw is rotated to an open position by the tube holding tool.

4. In a bleeding device for a hydraulic braking system as claimed in claim 2 wherein said means connecting the tubing to the vented container includes,
    (a) a transparent loop on said connector whereby fluid delivered from the tubing to the container will be visible to detect entrained air bubbles therein,
    (b) and a discharge line communicating with said transparent loop extending into said container.

5. In a bleeding device for a hydraulic braking system as claimed in claim 2 wherein said vented container includes,
    (a) a handle connected to the side thereof,
    (b) a receptacle extending into the handle and adapted to hold the tube holder tool therein during non-use of the bleeding device.

6. In a bleeding device for a hydraulic braking system as claimed in claim 2 wherein said vented container includes:
    (a) a cap, (b) a connecting line mounted on said cap and having a length extending into said container terminating just short of the bottom thereof, (c) and a transparent loop in said connecting line whereby fluid delivered from the tubing to the container will be visible to detect any entrained air bubbles therein, (d) handle means on said container, (e) and a receptacle formed in the longitudinal line of said handle means adapted to receive the tube holder tool therein when said bleeding device is not in operation.

7. A tool to operate the bleed screw of a hydraulic braking system and the like type device comprising:

(a) a hollow body portion and a handle portion connected to the hollow body portion, (b) a tube receiving opening at one end of said hollow body portion of the tool, (c) a bleed screw engaging means on said hollow body portion of the tool spaced from the tube receiving opening, (d) a tube, (e) said tube mounted in the hollow body portion concentric to the bleed screw engaging means and having one end terminating in a plane adjacent the bleed screw engaging means, (f) and said hollow body portion having a sufficiently large diameter on the inner wall inwardly of said bleed screw engaging means to permit said tool to engage and to seal said bleed screw, (g) and said tube disposed to extend out of the hollow body portion through said tube receiving opening to permit fluid to be transmitted therethrough to any desired point.

8. In a tool as claimed in claim 7, wherein:

(a) said sufficiently large diameter on the inner wall of said hollow body portion comprises a recess in the same plane as the end of the tube adjacent the bleed screw engaging means, (b) said tube having an inner diameter less than the diameter of the bleed screw, (c) and said recess having a diameter greater than the diameter of the bleed screw engaging means to permit the tube to expand and to sealingly engage the end of the bleed screw and to rotate therewith when the bleed screw is rotated to an open position by the tool.

References Cited by the Examiner
UNITED STATES PATENTS

| | | | |
|---|---|---|---|
| 381,436 | 4/1888 | Sherwood | 215—79 X |
| 1,582,758 | 4/1926 | Jones | 184—1.5 |
| 2,746,330 | 5/1956 | Pfetzing | 184—1.5 X |
| 3,156,381 | 11/1964 | Plentis | 222—159 X |

LAVERNE D. GEIGER, *Primary Examiner.*

H. S. BELL, *Assistant Examiner.*